(12) United States Patent
Irvine

(10) Patent No.: US 9,712,270 B2
(45) Date of Patent: *Jul. 18, 2017

(54) TRANSFER OF SYNCHRONIZATION IN A HYBRID GLOBAL NAVIGATION SATELLITE PACKET NETWORK SYSTEM

(71) Applicant: Telefonaktiebolaget LM Ericsson (publ), Stockholm (SE)

(72) Inventor: Garry Irvine, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,849

(22) Filed: May 4, 2016

(65) Prior Publication Data

US 2016/0248529 A1    Aug. 25, 2016

Related U.S. Application Data

(63) Continuation of application No. 14/035,248, filed on Sep. 24, 2013, now Pat. No. 9,357,516, which is a continuation of application No. 13/015,077, filed on Jan. 27, 2011, now Pat. No. 8,576,778.

(51) Int. Cl.
*H04J 3/06*  (2006.01)
*H04W 56/00*  (2009.01)

(52) U.S. Cl.
CPC ....... *H04J 3/0661* (2013.01); *H04W 56/0015* (2013.01)

(58) Field of Classification Search
None
See application file for complete search history.

(56) References Cited

U.S. PATENT DOCUMENTS

| 7,019,691 | B1 | 3/2006 | Soltanian et al. |
| 7,495,609 | B1* | 2/2009 | Woo ........................ G01S 19/05 |
| | | | 342/357.64 |
| 2005/0058149 | A1* | 3/2005 | Howe ..................... H04L 47/10 |
| | | | 370/428 |
| 2009/0047913 | A1* | 2/2009 | Kuru .................... H04B 7/2693 |
| | | | 455/76 |

(Continued)

FOREIGN PATENT DOCUMENTS

| JP | 2000357988 A | 12/2000 |
| WO | 2009157296 A1 | 12/2009 |

OTHER PUBLICATIONS

White Paper, "Precision Time Protocol (PTP)", EndRun Technologies, Nov. 2009, entire document.

(Continued)

*Primary Examiner* — Sulaiman Nooristany
(74) *Attorney, Agent, or Firm* — Patent Portfolio Builders PLLC

(57) ABSTRACT

Networks, network devices and methods of synchronization using transfer of synchronization packets are provided. Some network devices are configured to use either a timing reference extracted based on GPS signals or an imported timing reference, as an operative time reference. A network device from which to import the time reference is selected and may be updated to meet a selection rule related to the quality of receiving the transfer of synchronization packets.

16 Claims, 8 Drawing Sheets

(56) References Cited

U.S. PATENT DOCUMENTS

2009/0231191 A1    9/2009  Wu et al.
2011/0085540 A1    4/2011  Kuwabara

OTHER PUBLICATIONS

Motti Goren, "Achieving 1 μsec Accuracy with Distributed Master Architecture", IP Clock, 2010.
International Search Report in corresponding International Application No. PCT/IB2012/000127 mailed Aug. 9, 2012.
Written Opinion in corresponding International Application No. PCT/IB2012/000127 mailed Aug. 9, 2012.

* cited by examiner

TRANSFER OF SYNCHRONIZATION IN A HYBRID GLOBAL NAVIGATION SATELLITE PACKET NETWORK SYSTEM

RELATED APPLICATIONS

This application is a continuation of, and claims priority from, U.S. patent application Ser. No. 14/035,248, filed on Sep. 24, 2013, which is a continuation of, and claims priority from, U.S. patent application Ser. No. 13/015,077, filed on Jan. 27, 2011, entitled "Transfer of Synchronization in a Hybrid Global Navigation Satellite Packet Network System", the disclosure of which is incorporated here by reference.

TECHNICAL FIELD

The present invention generally relates to networks, network devices and methods used for the distribution of synchronization derived from a global navigation satellite system (GNSS), and, in particular, to the transfer of synchronization in a hybrid GNSS packet network system.

BACKGROUND

Deploying stand alone global positioning satellite (GPS) receivers at each base transceiver station (BTS) cell-site is a technique that has long been used to provide precision time synchronization having accuracy better than 1 microsecond ($\mu$s). For example, in the Code Division Multiple Access (CDMA) networks, the deploying of stand-alone GPS receivers at each cell-site has been used for over 15 years.

The Global Positioning System is a space-based global navigation satellite system (GNSS) that allows inferring reliable location and time information in all weather at a GPS receiver on the surface of the Earth, if there is an unobstructed line of sight from the GPS receiver to plural satellite vehicles (SVs). A GPS signal includes a number of parameters specific to the SV emitting the GPS signal, which parameters can be used to compute the precise location of the GPS receiver and a precise timing offset of the GPS receiver's clock to a time reference traceable to a common timebase. Thus, the GPS receiver can synchronize its timing with a network of GPS receivers, relative to a common timebase. A GPS receiver that is demodulating GPS signals received from plural SVs such that precise timing can be extracted is said to be locked.

In older systems, the antenna component of a GPS receiver had to have an unobstructed view of the SVs, for example, to be located on top of high buildings. Traditionally, there were two performance figures of merit regarding link margin of a GPS receiver: the acquisition sensitivity and tracking sensitivity. The acquisition sensitivity is the minimum signal quality carrier to noise ratio (C/No) required to demodulate and lock to a GPS signal from power-on; the tracking sensitivity is the minimum C/No required to maintain lock after the GPS signal acquisition has been achieved. The tracking sensitivity benefits from the availability of the SV parameters in the GPS signal demodulated by the GPS receiver. Another figure of merit associated with acquisition is the time required by a GPS receiver to achieve lock, this time being often referred to as the Time-to-First-Fix (TTFF). An Aided-GPS (A-GPS) operation uses network resources to send SV parameters to the GPS receiver in order to improve the acquisition sensitivity and the TTFF. This is of a benefit in poor signal conditions, for example in a city, where the GPS signals may suffer multipath propagation due to bouncing off buildings, or may be weakened by passing through various materials. Additionally, the C/No can be easily degraded by the presence of interfering jamming signals (intentional or not) due to the extremely low power of the GPS signal. The A-GPS technology has yielded a substantial improvement in the acquisition sensitivity, allowing the use of GPS receivers in more convenient physical location, e.g., inside of buildings. In an A-GPS receiver located in a degraded signal environment, an improved acquisition link margin offsets penetration losses and other degradation impairments of the GPS signals. However, since the penetration losses impairments are difficult to predict exactly, there is an increased uncertainty as to whether the GPS link margin will be (and will remain) adequate for a given deployment. Thus, an adequate margin for a particular deployment cannot be guaranteed. Additionally, the accuracy of the timing extracted from a degraded signal environment may also be degraded.

To summarize, although the A-GPS technique improves the GPS signal acquisition link margin, capitalizing on the A-GPS performance and relaxing the GPS antenna deployment provisioning rules, the A-GPS technique introduces an unacceptable uncertainty in the resultant link margin that limits its applicability in telecom products.

Packet-based synchronization methods such as the ones set forth in the IEEE-1588 standard have recently promised to substantially reduce the cost and improve the reliability of precision time synchronization. The predominant architecture associated with packet-based synchronization is to deploy a few timing servers (masters) within a network, the timing servers distributing timing to hundreds of clients (slaves). The timing servers are usually network devices distinct from the base stations (BTSs).

FIG. 1 illustrates packets messages involved with the IEEE-1588 (the January 2011 version of which is incorporated herewith by reference) method of transferring time synchronization between a master 10 and a slave 20, the sequence of operations being represented by via downwards time lines. The master 10 sends a SYNC message and embeds a master egress time (T1) according to the master clock in the SYNC packet's payload. The slave 20 receives the SYNC packet and marks a slave ingress time locally (T2) according to the slave clock. The slave 20 then sends a DELAY_REQUEST message (marking a slave egress time as T3 according to the slave clock). The master 10 marks a master ingress time (T4) of the DELAY_REQUEST message according to the master clock, and then sends a message DELAY_RESPONSE embedding T4 in the DELAY_RESPONSE packet's payload. The master egress time (i.e., the timestamp) T1 may be conveyed with a message called a FOLLOW_UP, according to a method referred to as a two-step clock. The SYNC and DELAY_REQUEST messages are termed "Event" messages since their delivery is time-stamped at both egress and ingress, whereas the FOLLOW_UP and DELAY_RESPONSE messages are referred to as "General" messages. Messages may be transported on a variety of communication protocols, for example, as Ethernet packets. The interval T4-T1-(T3-T2) represents the round trip propagation delay, which may be considered twice the single propagation delay (Tprop). Once the propagation delay (Tprop) is known by the slave 20, Tprop can be removed from T1 to synchronize the slave clock with the master clock. The key impairment to accurate synchronization over Ethernet networks is packet delay variation that may occur when a packet carrying an Event message encounters queuing delay.

The transfer of synchronization packets may convey frequency information and timing information. For the frequency information, only one-way communication is necessary, whereas for timing information two-way communication is required. Thus, in order to convey frequency information, reception of SYNC packet would suffice.

Since timing servers are expensive, they are typically deployed to serve a large number of clients. A fundamental problem with packet-based methods is that controlling the packet delay variation (PDV) over a large number of hops (which large number is inherent in this architectural model) is difficult without deploying specialized switching nodes that account for the internal packet delay. The PDV is a key metric to the delivery of adequate time synchronization accuracy.

Accordingly, it would be desirable to provide devices, systems and methods that avoid the afore-described problems and drawbacks.

SUMMARY

In some of the following embodiments, network devices may use either a time reference extracted based on GPS signals or an imported time reference, as an operative time reference. The improvement in availability and reliability of time references renders less stringent and important the requirement to have an expensive high-quality oscillator in order to holdover synchronization when lock of the GPS receiver is lost. Additionally, network devices may dynamically select another network device from which to import the time reference, based on a quality of receiving the transfer of synchronization packets from plural available network devices exporting their time reference.

According to one exemplary embodiment, a network device includes a global position signal (GPS) receiver, a switching part, an operative part and a controller. The GPS receiver is configured to receive GPS signals and to determine a time reference based on the received GPS signals. The switching part is configured to communicate transfer of synchronization packets. The operative part is configured to manage radio communication using an operative time reference. The controller is configured to switch the operative part between at least (i) a first mode, in which the operative part uses, as the operative time reference, the time reference determined by the GPS receiver and (ii) a second mode, in which the operative part uses, the operative time reference determined using one or more imported time references, each of the imported time references being extracted from the transfer of synchronization packets communicated with a network device, the controller switching the operative part between the first mode and the second mode depending on a quality of the received GPS signals and a quality of communicating the transfer of synchronization packets by the switching part from each of at least one other network device, respectively. The GPS receiver may be an A-GPS receiver. The controller may be configured to compare the time reference determined by the A-GPS receiver and the imported time reference thereby enabling qualifying the operative time reference. The controller may be configured select one of the at least one other devices and to determine the operative time reference to be an imported time reference corresponding to the selected network device. The controller may also be configured to calculate the operative time reference as a weighted average of at least two of the time reference determined by the GPS receiver and the imported time references, wherein weights used to calculate the weighted average depend on the quality of the received GPS signals and the quality of receiving transfer of synchronization packets.

According to one exemplary embodiment, a radio communication network includes base stations each having a switching part configured to communicate transfer of synchronization packets, the switching part being configured to process the communicated transfer of synchronization packets with highest priority, and an operative part configured to manage radio communication using an operative time reference. At least some of the base stations have a global position signal (GPS) receiver configured to receive GPS signals and to determine a time reference based on the received GPS signals, and a controller configured to switch the operative part between at least (i) a first mode, in which the operative part uses, as the operative time reference, the time reference determined by the GPS receiver and (ii) a second mode, in which the operative part uses the operative time reference determined using one or more imported time references, each imported time reference being extracted from the transfer of synchronization packets communicated with a network device, the controller switching the operative part between the first mode and the second mode depending on a quality of the received GPS signals and a quality of receiving the transfer of synchronization packets by the switching part from each of at least one network device, respectively.

According to another exemplary embodiment a method of determining an operative time reference in a GPS equipped radio communication device of a network including at least two other GPS equipped radio communication devices is provided. The method includes receiving GPS signals, evaluating quality of the GPS signals, and determining a time reference based on the received GPS signals, if the quality of the received GPS allows. The method further includes receiving transfer of synchronization packets from at least one GPS equipped network device, evaluating a quality of receiving the transfer of synchronization packets for each of the at least one GPS equipped network devices from which transfer of synchronization packets have been received, selecting one network device among the at least one GPS equipped network devices from which transfer of synchronization packets have been received based on the evaluated quality, and determining an imported time reference from the transfer of synchronization packets received from the selected one network device. The method also includes determining whether to use the time reference or the imported time reference as the operative time reference, based on the evaluated quality of the received GPS signals and the quality of receiving the transfer of synchronization packets from the selected one network device.

According to another exemplary embodiment, a network device has a switching part configured to communicate transfer of synchronization packets, an operative part and a controller. The operative part is configured to manage radio communication using an operative time reference, the operative time reference being based on information extracted from the transfer of synchronization packets received from at least two network device. The controller is configured (i) to monitor a quality of receiving the transfer of synchronization packets for each of the at least two network devices, and (ii) to determine the operative time reference using one or more imported time references, each time reference being extracted from the transfer of synchronization packets received from a network device among the at least two network devices based on the monitored quality of communicating.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a communication network in which some network devices import timing synchronization from other network devices that export timing synchronization. The embodiments to be discussed next are not intended to be limiting, a flexible distributed timing synchronization being applicable to other systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
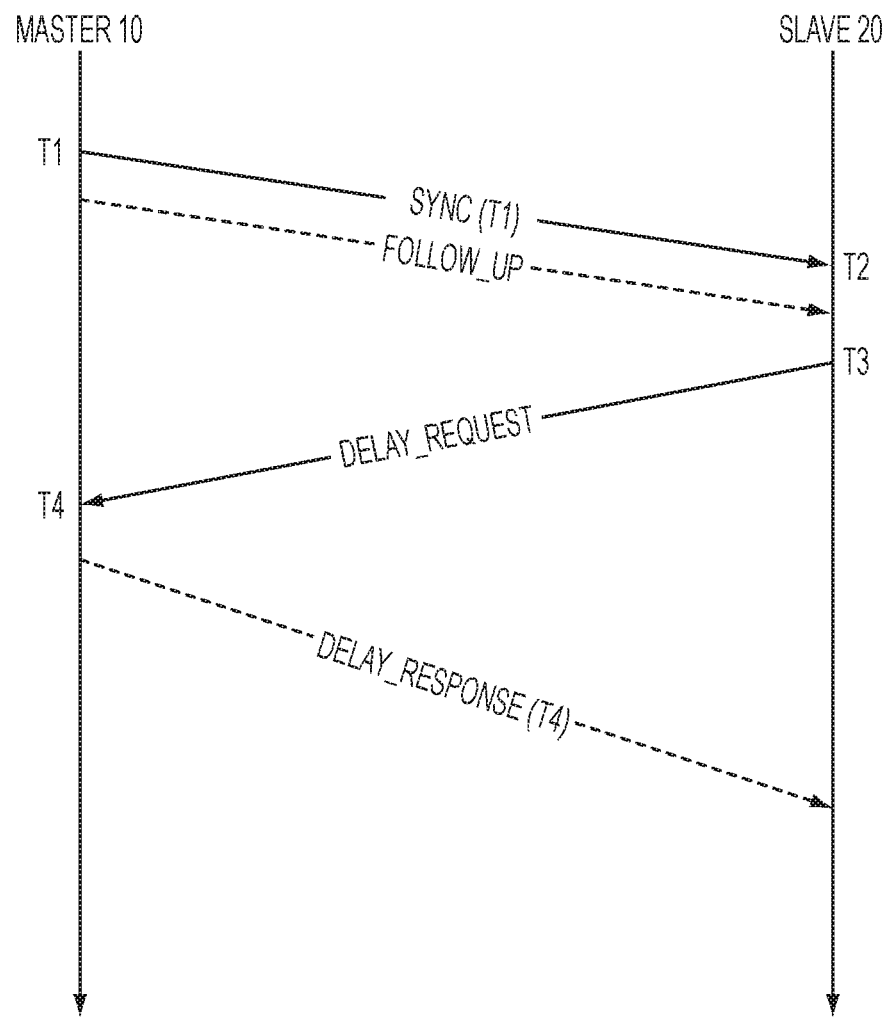
FIG. 1 is an illustration of the IEEE-1588 method of transferring time synchronization.
Figure 2:
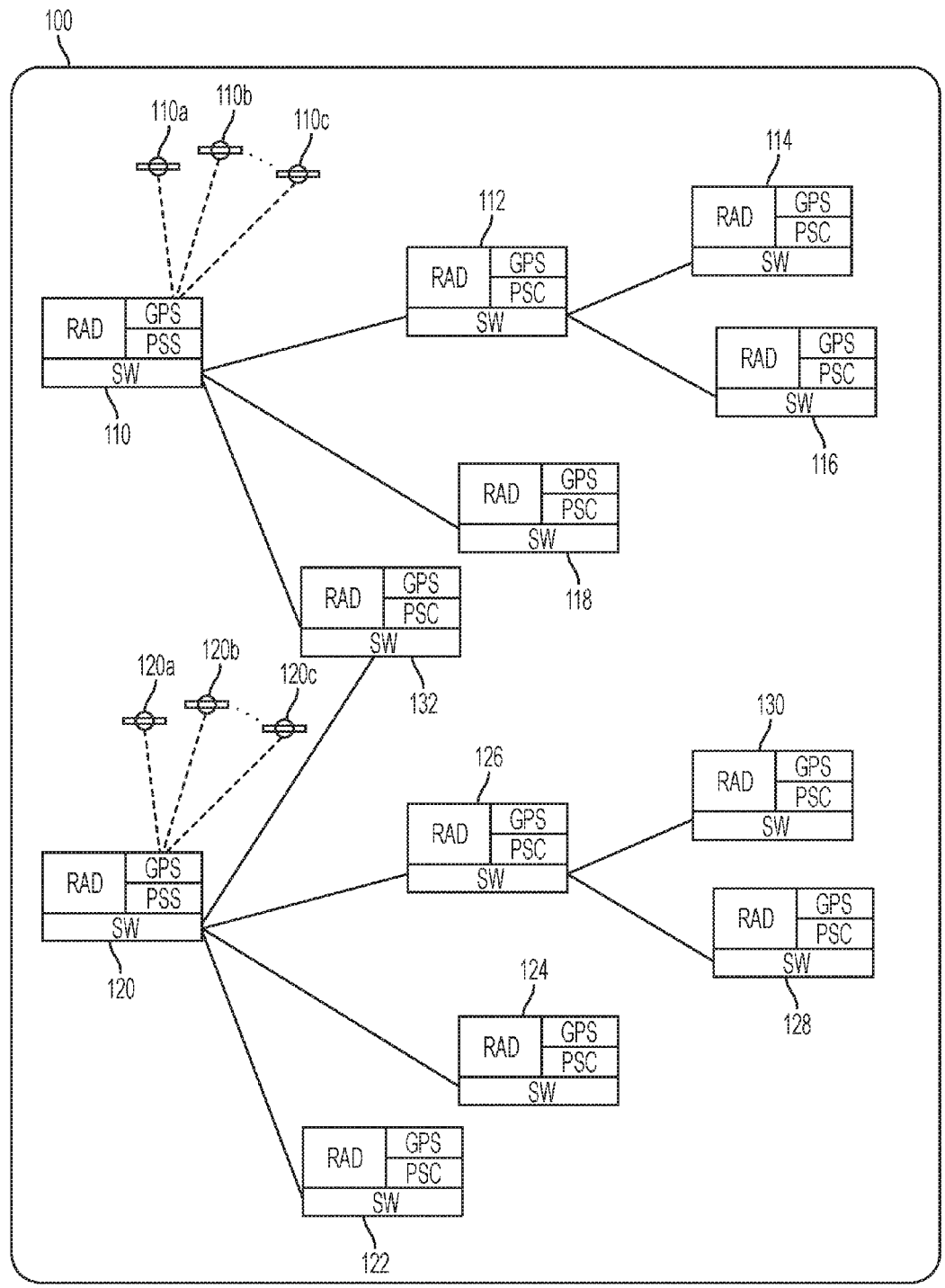
FIG. 2 is a schematic diagram of a network according to an exemplary embodiment.

According to an exemplary embodiment illustrated in FIG. 2, in a network 100, timing synchronization is performed based on high priority transfer of synchronization packets sent by network devices operating as packet-based synchronization servers (PSSs) such as 110, 120 to network devices operating as packet-based synchronization clients (PSCs) such as 112, 114, 116, 118, 122, 124, 126, 128, 130, and 132. The network devices operating as PSSs or as PSCs may be base stations (BTSs). However, the inventive concept is not limited by the functionality of the network devices. The transfer of synchronization packets may be performed in a manner similar to the IEEE-1588 method of transferring time synchronization illustrated in FIG. 1, but it is not limited thereof.

Figure 3:
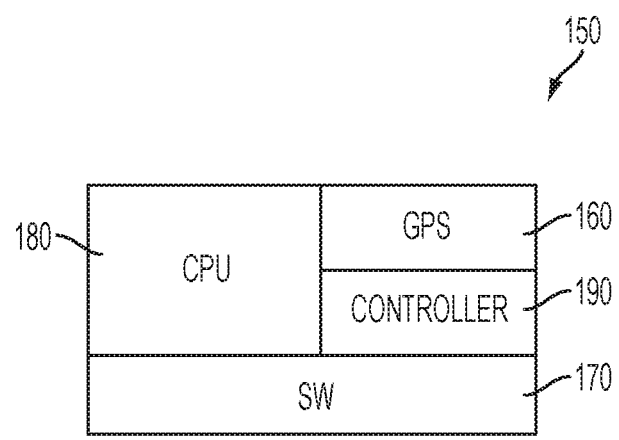
FIG. 3 is a schematic diagram of a network device according to an exemplary embodiment.

All the network devices illustrated in FIG. 2 may have the structure illustrated in FIG. 3. A network device 150 includes a GPS receiver 160, a switching part 170, an operative part 180 and a controller 190. The GPS receiver 160 is configured to receive GPS signals and to determine a time reference based on the received GPS signals. The GPS receiver 160 may be an A-GPS receiver. The switching part 170 is configured to receive and to send transfer of synchronization packets. The operative part 180 is configured to manage radio communication using an operative time reference. However, the embodiments are not limited by radio (wireless) communication, that is, some of the network devices may also (or exclusively) communicate via wire.

The controller 190 is configured to switch the operative part 180 between at least (i) a first mode in which the operative part 180 uses, as the operative time reference, the time reference determined by the GPS receiver 160 and (ii) a second mode in which the operative part 180 uses, as the operative time reference, an imported time reference extracted from the transfer of synchronization packets received from a selected network device. The controller 190 switches the operative part 180 between the first mode and the second mode depending on a quality of the received GPS signals and a quality of receiving transfer of synchronization packets by the switch 170 from other network devices, respectively. The controller 190 may be configured to switch off the GPS receiver 160 when the operative part 180 does not operate in the first mode. Also, the controller 190 may control the switching part 170 to send transfer of synchronization packets based on the time reference determined by the GPS receiver 160 to other network devices (i.e., to export its time reference).

In various embodiments, depending on the specific functionality of the operative part 180, the extracting of the imported time reference may require frequency information or timing information. If only frequency information is required, then only one-way communication (e.g., Event messages and associated General messages sent from PSS to PSC) is necessary. If timing information is required, then a two-way communication (e.g., Event messages and associated General messages from PSS to PSC and from PSC to PSS) is necessary. The controller 190 may be configured to control the switching part 170 to communicate the necessary messages in order to ensure gather the transfer of synchronization packets necessary to extract the frequency information or the timing information. In order to maintain the synchronization, the transfer of synchronization packets are sent by the PSS at regular time intervals, which may be calibrated based on various factors such as the fraction of packets that do not experience queuing delays and the amount of time a clock of the network device operating as a PSC can run without deviating (e.g., a local oscillator may drift due to noise or temperature effects). On the one hand, the time intervals should not be too small because this would result in more packets than necessary and wastefully congest the network. In the case of two-way communication, a time interval between related packets may be different from a time interval between un-related packets. The network device operating as a PSC may dynamically negotiate the time interval(s).

For the purpose of illustration, the network devices in FIG. 2 have their controller marked as PSS, when the controller switches the operative part to operate in the first mode, and have their controller marked as PSC, when the controller switches the operative part to operate in the second mode. All the network devices in FIG. 2 are illustrated as having a GPS receiver. However, the network 200 may include also the network devices not equipped with a GPS receiver.

The network 100 includes network devices equipped with GPS receivers that may operate both in the first mode and, alternatively, in the second mode. The flexibility of timing synchronization occurs if there are at least two network devices capable to operate as PSSs. In contrast with the networks that use dedicated timing servers and where a timing server exports its time reference to a large number of network devices, in the network 100, plural network devices are configured to serve as PSSs. In one embodiment, the GPS equipped network devices may preferentially operate in the first mode, but if necessary (e.g., if their GPS receiver is unable to lock) may operate in the second mode, using time references from other network devices. Due to a large number of available time references, the network 100 inherently and statistically provides the basis for an enhanced synchronization for any network device that is not equipped with a GPS receiver or is unable to use its own GPS based time reference.

In the network 100, the switching parts of the network devices are configured to process received packets based on a priority associated to each packet, the transfer of synchronization packets having the highest priority. The network devices 110, 112, 114, 116, 118, 120, 122, 124, 126, 128, 130, and 132 may be base stations.

The network devices that operate as PSSs have each an active GPS section configured to receive GPS signals from plural satellite vehicles (SVs) 110a, 110b, 110c, 120a, 120b, 120c, and to extract their respective time reference based on the GPS signals. The network devices that operate as PSCs may also have each a GPS receiver, but their GPS receivers may not be actively used. However, at least some of the network devices in the network 100 are capable (i) to perform intrinsic GPS timing synchronization (i.e., first mode), (ii) to import timing synchronization as a packet-based client (PSC) (i.e., second mode), and (iii) to export packet-based timing synchronization as a packet-based server (PSS). Therefore, the network 100 as a whole provides enhanced capabilities and dynamic adaptability to traffic conditions due to the flexibility resulting from multi-timing server and dual possible operation of at least some of the network devices.

Each network device in FIG. 2 has a switching part (SW) configured to receive packets from other network devices. The transfer of synchronization packets has the highest priority, the synchronization packets being processed as soon as possible. The lines between the network devices in FIG. 2 show transfer paths of the transfer of synchronization packets. A network device operating as a PSC may receive transfer of synchronization packets from more than one network device operating as a PSS (see, e.g., the network device 132 in FIG. 2, receiving transfer of synchronization packets from both the network device 110 and the network device 120).

Figure 4:
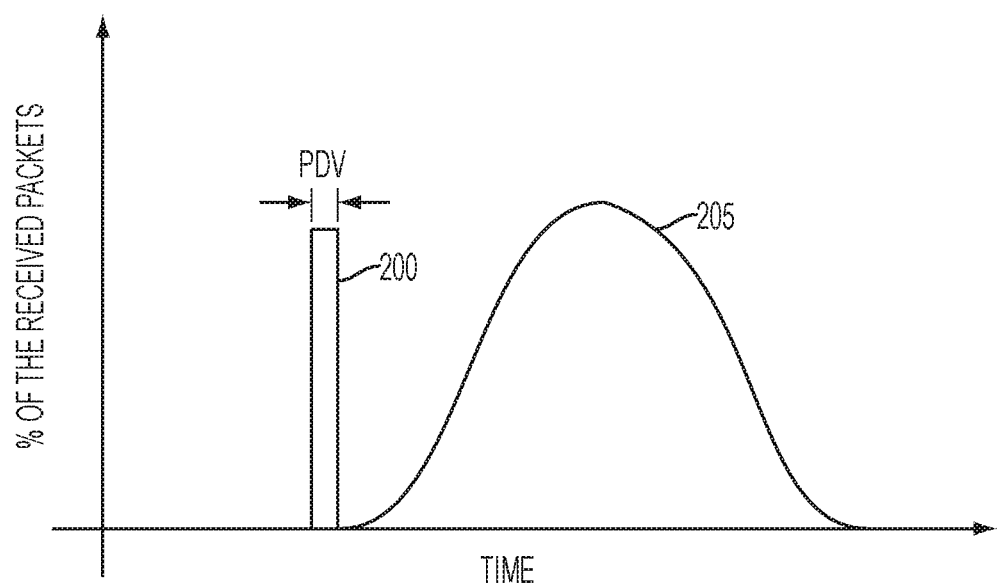
FIG. 4 is a graph illustrating a delay distribution for packets transmitted between two network devices according to an exemplary embodiment.

Thus, in the network 100, the timing synchronization function is decentralized being performed by more than one network device operating as timing servers (PSSs). A network device operating as a PSC (or more specifically the controller of this network device) may select a timing server (PSS) among the network devices whose transfer of synchronization packets are received at the network device operating as a PSC, based on a minimum packet delay variation (PDV). The PDV is a variation of the packet propagation delay between a PSS and a PSC that may import the time reference from the PSS. FIG. 4 is a graph illustrating a delay distribution for packets transmitted between two network devices (one of which may be PSS and the other may be PSC). In this graph, a peak 200 corresponds to packets experiencing no spurious delays, while the bell shaped part 205 of the distribution corresponds to delayed packets.

In selecting the PSS, the PSC may consider only a "golden" group of packets that have a high PDV quality (e.g., in the peak 200) as these packets experience no queuing delays between source (e.g., a PSS) and destination (e.g., a PSC). Achieving a good performance based on this condition means not only to have a small number of hops (e.g., intermediate network devices) between the PSS and the PSC, but also that no unpredictable delays due to disturbing traffic are expected to appear. Disturbing traffic are packets unrelated to the synchronization link. Some of these packets may require a long time for processing. Although the timing packet has a higher priority than such a packet of the disturbing traffic, the switch of an intermediate network device may not be able to process the timing packet before finishing processing the packet of the disturbing traffic. This results in a non-deterministic queuing delay yielding an increased PDV for the transfer of synchronization packets.

In one embodiment, a network device performing as PSS may have a traditional GPS receiver antenna deployed to have a clear-sky view. The network devices operating as a PSC selects one of the PSSs in the network relative to which to perform timing synchronization, the selected PSS being within a limited number of hops and subject to a minimum PDV criterion.

Figure 5:
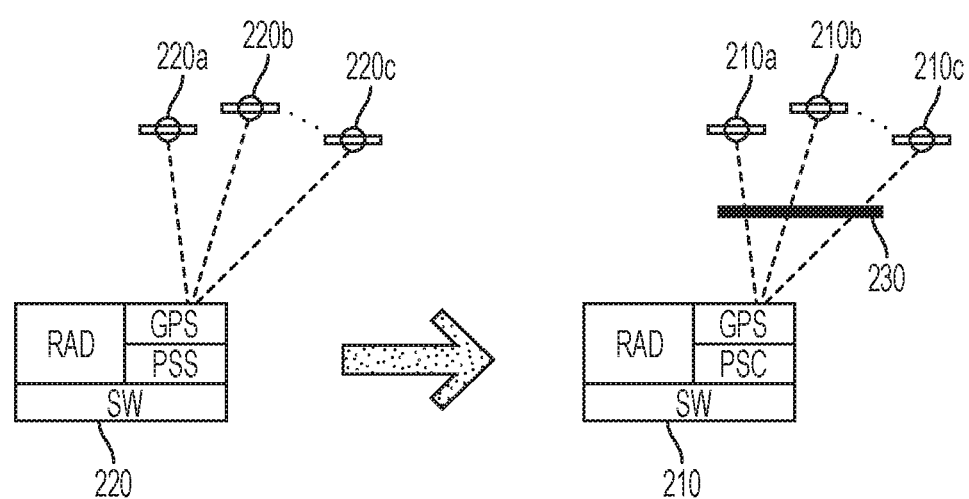
FIG. 5 is a schematic diagram of network devices in a network according to an exemplary embodiment.

Most of the network devices that have a GPS receiver frequently also have an internal high-stability oscillator that allows the network device to holdover the timing synchronization when the lock of the GPS receiver is lost, for example, due to an obstruction interposing in the GPS signal paths. According to an embodiment, whose operation is illustrated in FIG. 5, an impaired network device 210, whose GPS receiver has lost lock, e.g., due to a blockage illustrated as solid line 230, imports a time reference from a network device 220 operating as a PSS, whose GPS receiver is unobstructed and locked. For example, the network device 220 has a clear-sky view to SVs 220a, 220b and 220c, while the network device 210's view of SVs 220a, 220b, and 220c is obstructed. The improvement in availability and reliability of time references renders less stringent and important the requirement to have an expensive high-quality oscillator in order to holdover synchronization when lock of the GPS receiver is lost.

Figure 6:
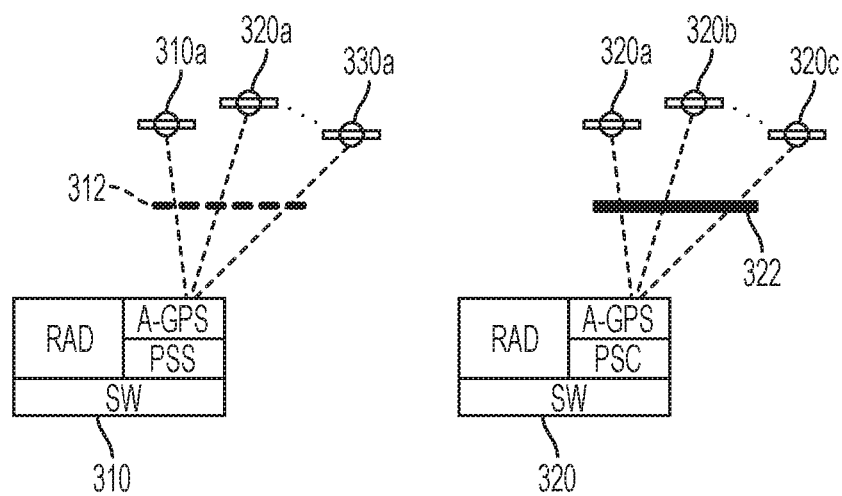
FIG. 6 is a schematic diagram of network devices in a network according to another exemplary embodiment.

According to another embodiment, in a network, most of the network devices have either a degraded view or an obstructed view, and each network device has an A-GPS receiver section. In FIG. 6, a network device 310 has a degraded view to SVs 310a, 310b, 310c, for example, due to multiple path reflections and penetration loss. This degradation is symbolically illustrated by a dashed line 312. Another network device 320 has its view to SVs 320a, 320b, 320c obstructed. This obstruction is symbolically illustrated by a solid line 322. The network device 310 may receive transfer of synchronization packets from other network devices that have degraded views, but that are able to compile a valid time reference due to the A-GPS receiver sections. A controller of the network device 310 may compare the accuracy of a time reference extracted based on the received GPS signals using A-GPS technology, with imported time references from one or more other network devices in order to qualify and, thereby, improve the reliability of the extracted time reference. The controller of the network device 310 may also be configured to trigger an alarm when the comparing indicates that a difference between the time reference determined based on the received GPS signals and an imported time reference exceeds a predetermined value. The controller may then employ additional methods to quantify the difference and to correct the time reference determined based on the received GPS signals, if possible. The network device 310 may meanwhile also export its GPS time reference to other network devices, thus operating both as a PSS and as a PSC.

The controller of the network device 310 may switch the operative part to operate in a third mode in which the operative part uses, as the operative time reference, an weighted average of at least two of the time reference determined based on the receiver GPS signals and imported time references, each imported time reference being extracted from the transfer of synchronization packets received from a network device. The weights may depend on a quality of the received GPS signals and a quality of receiving transfer of synchronization packets by the switch from other network devices, respectively.

A controller of a network device that can operate both as a PSS and as a PSC may also be configured select a new PSS among the network devices from which a switching part of the network device receives transfer of synchronization packets, based on the same selection rule, when a selected PSS no longer meets the selection rule or is no longer available.

Figure 7:
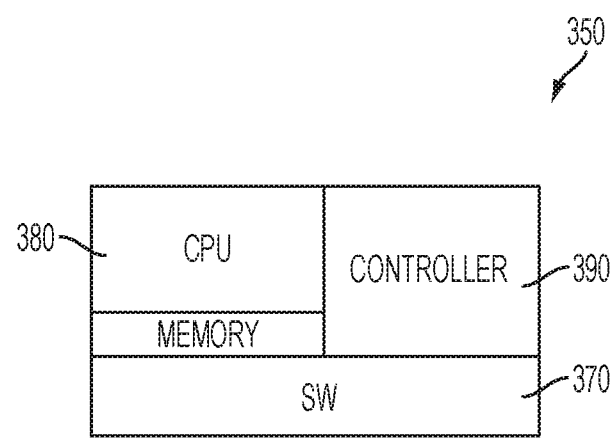
FIG. 7 is a schematic diagram of network device according to an exemplary embodiment.

As mentioned above, a network device 350 without a GPS receiver may be a part of the network 100 and benefit from availability of plural PSSs. The structure of the network device 350 is illustrated in FIG. 7. The network device 350 includes a switching part 370, an operative part 380 and a controller 390. These components may be hardware, firmware, software or a combination thereof. The switching part 370 is configured to receive transfer of synchronization packets from plural network devices operating as PSSs. The operative part (380) is configured to manage radio communication using an operative time reference. The operative time reference is an imported time reference extracted from the transfer of synchronization packets received from a selected PSS. The controller (390) is configured (i) to monitor a quality of receiving transfer of synchronization packets from each of at least two network devices operating as PSSs and (ii) to select a PSS from the at least two network devices based on a selection rule linked to the quality of receiving the transfer of synchronization packets.

The selection rule used by the controller 390 to select a PSS may be that the transfer of synchronization packets received from the selected PSS to have a smallest packet delay variation (PDV) among packet delay variations corresponding to the at least two network devices operating as PSSs. The controller 390 may select network device from which the switching part receives transfer of synchronization packets, based on the selection rule, when the selected PSS no longer meets the selection rule or is no longer available.

Figure 8:
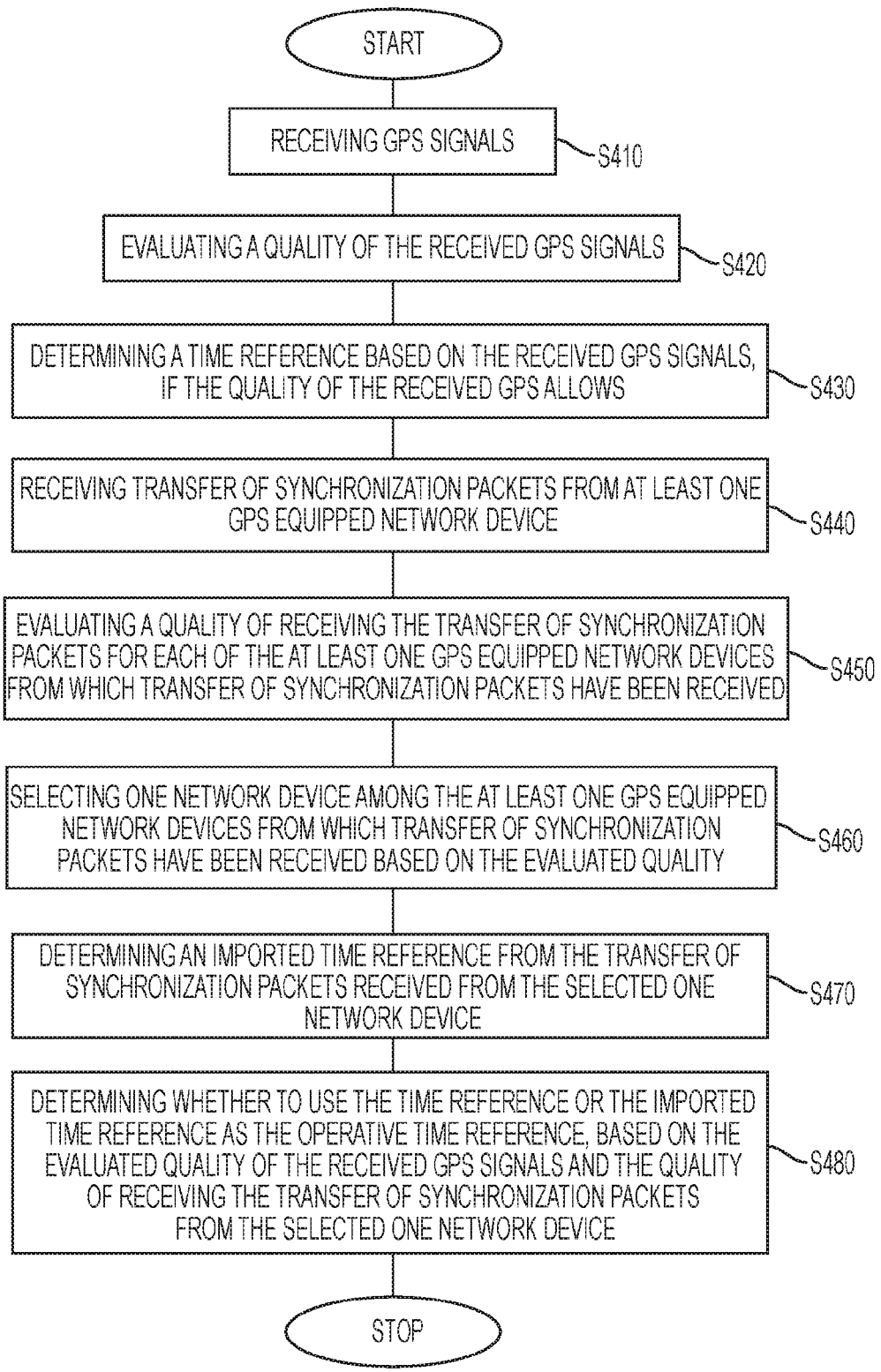
FIG. 8 is a flow diagram of a method according to an exemplary embodiment.

A flow chart of a method (400) of determining an operative time reference in a GPS equipped radio communication device of a network including at least two GPS equipped radio communication devices is illustrated in FIG. 8. The method 400 may be performed by any network device in FIG. 2. The method 400 includes receiving GPS signals, at S410, and evaluating a quality of the received GPS signals, at S420. Further the method 400 includes determining a time reference based on the received GPS signals if the quality of the received GPS allows, at S430.

The method 400 also includes receiving transfer of synchronization packets from at least one GPS equipped network device at S440, and evaluating a quality of receiving the transfer of synchronization packets for each of the at least one GPS equipped network devices from which transfer of synchronization packets have been received, at S450. The method 400 further includes selecting one network device among the at least one GPS equipped network devices from which transfer of synchronization packets have been received based on the evaluated quality, at S460) and determining an imported time reference from the transfer of synchronization packets received from the selected one network device, at S470. Note that the operations at S410, S420 and S430 may be executed in parallel with the operations at S440, S450, S460 and S470.

The method 400 finally includes determining whether to use the time reference or the imported time reference as the operative time reference, based on the evaluated quality of the received GPS signals and the quality of receiving the transfer of synchronization packets from the selected one network device at S480.

The method 400 may be stored as executable codes on a computer readable medium. The computer readable medium may be hard and floppy disk drives, CD-ROM drives, and other hardware capable of storing information.

An advantage of some embodiments is the flexibility of using self-GPS based time references or imported time references. Also, some embodiments may both take advantage of the time references exported by GPS equipped network devices that have a clear-sky view when these are available, and compensate for the absence of a reliable time reference using A-GPS technology. In addition, some embodiments select the network device from which the time reference is imported based on the PDV and on an expected absence of disturbing traffic, thus, taking advantage of current traffic information. Embodiments may update the selection of a network device from which to import the time reference, thereby having the advantage of adaptability. Sometimes, it may be necessary to modify the path through which transfer of synchronization packets are received in order to satisfy the required PDV performance.

When a GPS receiver loses its lock to the GPS signals, an alternative to the use of a high quality expensive oscillator (that can sustain open-loop time synchronization typically for a period of 8-24 hours) is provided by importing the time reference from another network device. Since higher synchronization reliability and availability is achieved, the provisions for holdover, in particular the quality of the oscillator, can be relaxed substantially, allowing the use of cheaper oscillators.

The redundant packet-based synchronization methods according to various embodiments used in conjunction with A-GPS provides: 1) redundancy to guarantee synchronization availability suitable with telecom standards; 2) improve/audit the accuracy of the A-GPS derived time synchronization attached to the local BTS against an ensemble of neighbor A-GPS or GPS BTS references imported via the packet network.

The disclosed exemplary embodiments provide networks, network devices and methods of synchronization using transfer of synchronization packets, in which some network devices may use either a time reference extracted based on GPS signals or an imported time reference as an operative time reference or both. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

What is claimed is:

1. A network device comprising:
a switching part configured to communicate transfer of synchronization packets;
an operative part configured to manage radio communication using an operative time reference, the operative time reference being based on information extracted from the transfer of synchronization packets received from at least two network devices; and
a controller configured
to monitor a quality of communicating transfer of synchronization packets for each of the at least two network devices; and
to determine the operative time reference using one or more imported time references, each time reference being extracted from the transfer of synchronization packets received from a network device among the at least two network devices based on the monitored quality of communicating,
wherein the network device and the at least two network devices are base stations;
wherein the at least two network devices both include GPS receivers, which are used to generate the synchronization packets.

2. The network device of claim 1, wherein the controller is configured to determine the operative time reference to be an imported time reference corresponding to a selected network device among the at least two network devices, and is further configured to determine the selected network device based on a selection rule linked to the monitored quality of communicating the transfer of synchronization packets from each of the at least two network devices.

3. The network device of claim 2, wherein the selection rule is the transfer of synchronization packets received from the selected network device to have a smallest packet delay variation among packet delay variations corresponding to the at least two network devices.

4. The network device of claim 2, wherein the controller is further configured
to select a new network device among the at least two network devices with which the switching part communicates the transfer of synchronization packets, based on the selection rule, when the selected network device no longer meets the selection rule or is no longer available.

5. The network device of claim 2, wherein the transfer of synchronization packets include packets used to extract frequency information.

6. The network device of claim 2, wherein the transfer of synchronization packets include packets used to extract frequency information and packets used to extract timing information.

7. The network device of claim 2, wherein the controller is configured to determine the operative time to be a weighted average of a plurality of time references, weights used to calculate the weighted average being based on the monitored quality.

8. The network device of claim 1, wherein the switching part is configured to process packets based on a priority associated to each packet, the transfer of synchronization packets having the highest priority.

9. A method for a network device comprising:
communicating transfer of synchronization packets, including receiving the transfer of synchronization packets from at least two network devices;
monitoring a quality of the communicating transfer of synchronization packets for each of the at least two network devices
extracting one or more imported time references from the transfer of synchronization packets received from a network device among the at least two network devices based on the monitored quality of communicating;
determining an operative time reference using the one or more imported time references; and
managing radio communication using the determined operative time reference, wherein
the network device and the at least two network devices are base stations;
wherein the at least two network devices both include GPS receivers, which are used to generate the synchronization packets.

10. The method of claim 1, further comprising:
determining the operative time reference to be an imported time reference corresponding to a selected network device among the at least two network devices; and
determining the selected network device based on a selection rule linked to the monitored quality of communicating the transfer of synchronization packets from each of the at least two network devices.

11. The method of claim 10, wherein the selection rule is the transfer of synchronization packets received from the selected network device to have a smallest packet delay variation among packet delay variations corresponding to the at least two network devices.

12. The method of claim 10, further comprising:
selecting a new network device among the at least two network devices with which the network device communicates the transfer of synchronization packets, based on the selection rule, when the selected network device no longer meets the selection rule or is no longer available.

13. The method of claim 10, wherein the transfer of synchronization packets include packets used to extract frequency information.

14. The method of claim 10, wherein the transfer of synchronization packets include packets used to extract frequency information and packets used to extract timing information.

15. The method of claim 10, further comprising:
determining the operative time to be a weighted average of a plurality of time references, weights used to calculate the weighted average being based on the monitored quality.

16. The method of claim 9, further comprising:
processing packets based on a priority associated to each packet, the transfer of synchronization packets having the highest priority.

* * * * *